United States Patent [19]

Thompson, Jr.

[11] Patent Number: 5,180,197
[45] Date of Patent: Jan. 19, 1993

[54] PIPE JOINTING SYSTEM

[76] Inventor: Ernest R. Thompson, Jr., P.O. Box 144, Girard, Kans. 66743

[21] Appl. No.: 772,215

[22] Filed: Oct. 7, 1991

[51] Int. Cl.$^5$ .......................................... F16L 17/025
[52] U.S. Cl. ................................... 285/351; 285/369; 285/921; 29/450
[58] Field of Search ............... 285/369, 345, 120, 351, 285/921; 29/450, 520; 277/210

[56] References Cited

U.S. PATENT DOCUMENTS

| | | | |
|---|---|---|---|
| 689,045 | 12/1901 | Fruin et al. | 285/120 |
| 1,926,197 | 9/1933 | Durr | 285/369 |
| 2,615,741 | 10/1952 | Nathan | 285/369 |
| 3,266,821 | 8/1966 | Safford | 285/369 |
| 3,682,503 | 8/1972 | Bloom | 285/369 X |
| 4,097,070 | 6/1978 | Acda | 285/369 X |
| 4,580,816 | 4/1986 | Campbell et al. | 285/321 |
| 4,779,902 | 10/1988 | Lee | 285/260 |
| 4,824,145 | 4/1989 | Carlsson | 285/38 |
| 4,893,848 | 1/1990 | Melcher | 285/258 |
| 4,969,670 | 11/1990 | Bonnema et al. | 285/319 |
| 4,993,756 | 2/1991 | Bechu | 285/319 |

FOREIGN PATENT DOCUMENTS

| | | | |
|---|---|---|---|
| 836770 | 4/1952 | Fed. Rep. of Germany | 285/369 |
| 2938006 | 3/1981 | Fed. Rep. of Germany | 285/369 |
| 985538 | 12/1982 | U.S.S.R. | 285/369 |
| 2207474 | 2/1989 | United Kingdom | 285/369 |

Primary Examiner—Dave W. Arola
Attorney, Agent, or Firm—Litman, McMahon & Brown

[57] ABSTRACT

An improved pipe jointing system includes sections of pipe having annular grooves about each of the ends thereof and a coupling having a rigid outer layer and an elastomeric inner layer fixedly secured thereto. The inner layer has a medial, inwardly directed lip and a pair of opposing sets of sawtooth ridges, one set disposed on each side of the lip. A pair of the pipes inserted into opposing ends of one of the couplings in end-to-end relationship compresses the respective lip therebetween forming a fluid-tight seal between the coupling and the pipes. The grooves are adapted to receive respective ones of the sawtooth ridges such that axial movement of the pipes relative to the coupling is resisted. A modified embodiment provides a pipe and coupling system whereby an elastomeric inner layer of the coupling creates sufficient frictional force to resist axially outward movement of the pipes relative to the coupling.

2 Claims, 1 Drawing Sheet

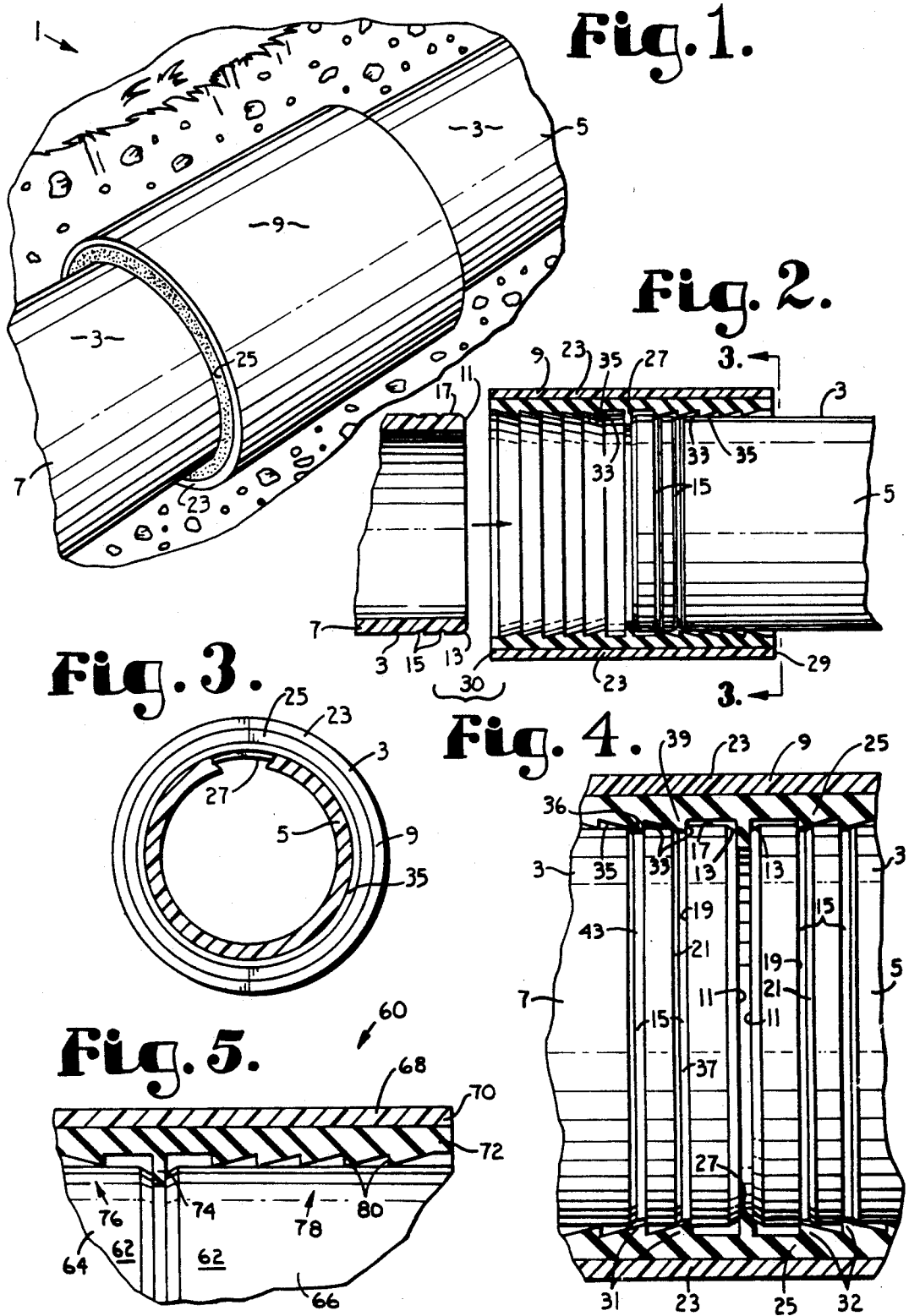

PIPE JOINTING SYSTEM

BACKGROUND OF THE INVENTION

1. Field of the Invention

The present invention relates generally to pipes and pipe couplings and, more particularly but without limitation, to semi-rigid plastic pipes and pipe couplings.

2. Description of the Related Art

Piping plays an important role in many widely diversified applications. For instance, piping is used as conduits for containing various high voltage and low voltage, direct current and alternating current electrical conductors. Also, piping is widely used for conveying various types of fluids, such as water, gases, chemicals, and sewage. Such fluid is conveyed through such piping by various means, including gravitationally and by pressure gradients.

Such pipes are used in various types of surrounding environments, such as atmospheric, aquatic, and subterranean. Many of these applications require that the pipes provide an effective, fluid-tight barrier between the contents of the pipes and the environment surrounding the pipes. For example, the piping may need to provide a shield for protecting electrical conductors contained within the pipe from corrosive or hostile elements surrounding the pipe. Similarly, the pipe may need to protect the surrounding environment from obnoxious chemicals or sewage coursing through the pipe.

Many of the applications not only require that the pipe provide an effective shield but also require that the pipe be installed in circumstances which provide extremely limited access and confining surroundings during installation thereof.

With greater emphasis being placed on environmental considerations, many cements (particularly those which are solvent based) which are used to secure adjacent sections of pipe together in an end-to-end aligning relationship are meeting increasing resistance due to fear of contamination.

What is needed is a pipe jointing system which can be relatively easily installed in confining circumstances while providing an effective and reliable cementless sealing joint between pipe sections in various piping applications.

SUMMARY OF THE INVENTION

An improved pipe jointing system is provided for connecting coaxial sections of pipe in an end-to-end arrangement. The system includes a plurality of sections of pipe and a plurality of pipe couplings. Each of the couplings has an outer semi-rigid layer fixedly secured to an inner, compressible elastomeric layer. The inner layer has a medially spaced, inwardly directed lip and a pair of opposing sets of inwardly directed, sawtoothed ridges, one of each set disposed on a different side of the lip. A mating side of each of the sawtooth ridges, which faces the lip, is generally radially Oriented and a back side of each of the sawtooth ridges connects a tip of one of the sawtooth ridges with an outermost portion of the mating side of the adjacently spaced sawtooth ridge.

Each end of each one of the pipe sections has at least one peripheral groove in an outer surface thereof. Each of the grooves has a first wall, which is disposed closer to the nearer end of the pipe and which is generally radially oriented, and a second wall, which is slanted away from the respective first wall of the groove. Each of the grooves is spaced from the nearer end of the pipe such that the mating side of a respective one of the sawtooth ridges is in snug abutting engagement with the first wall of the grooves as the respective end of the pipe, inserted into the coupling, is in abutting engagement with the lip of the coupling receiving the end of the pipe. The abutting engagement between the mating sides of the sawtooth ridges of the coupling and the respective first walls of the grooves of the end of the pipe provides the ability to resist axially outward movement of the pipe relative to the coupling.

The lip of the coupling is compressed between the ends of two of the pipes inserted into the same coupling such that the lip forms a fluid-tight seal with each of the ends of the pipes.

Each of the sawtooth ridges which is not received by one of the grooves in the pipes remains compressed between the respective pipe and the outer shell of the coupling, providing means to retain the pipes inserted in the coupling in coaxial, end-to-end alignment. The back sides of the sawtooth ridges assist with compression of the elastomeric layer as the end of each one of the pipes is being inserted into the coupling.

A modified embodiment of the improved pipe jointing system provides pipes which have outer surfaces without grooves but which exhibit sufficient frictional forces between pipes inserted into a coupling and an inner elastomeric layer of the coupling compressed between the pipes and a rigid shell of the coupling to resist axially outward movement of the pipes relative to the coupling.

OBJECTS AND ADVANTAGES OF THE INVENTION

Therefore, the principal objects and advantages of the present invention include: providing an improved pipe jointing system; providing such a system which results in an effective fluid-tight seal between end-to-end sections of pipe and a coupling therebetween; providing such a system which has a locking action for resisting axial movement of end-to-end sections of pipe relative to a coupling therebetween; providing such a system which permits relatively unrestricted flow of fluids therethrough; providing such a system which results in a reliable, sealing connection for an extended period of time; providing such a system which eliminates the need for the use of contaminating and solvent-based cements to form a fluid-tight joint between end-to-end sections of pipe; and to generally provide such a system which is efficient and reliable, economical to manufacture, safe to use, easy to install, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a pipe jointing system, according to the present invention.

FIG. 2 is a partially cross-sectional view of the pipe jointing system, showing a tube inserted in a coupling.

FIG. 3 is a partially cross-sectional view of the pipe jointing system, taken generally along line 3—3 of FIG. 2 and showing a portion cut away to reveal details thereof.

FIG. 4 is an enlarged and fragmentary, partially cross-sectional view of the pipe jointing system, showing two of the tubes inserted in the coupling.

FIG. 5 is a fragmentary, partially cross-sectional view of a modified embodiment of a pipe jointing system, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

1. Preferred Embodiment of the Invention

The reference numeral 1 generally refers to a pipe jointing system according to the present invention, as shown in FIGS. 1–4. The pipe jointing system 1 includes a plurality of pipe sections 3, such as the sections 5 and 7 as shown in FIG. 1, and a plurality of couplings 9. Each of the pipe sections 3 is generally cylindrically shaped and constructed of semi-rigid material, such as polyvinylchloride (PVC) or the like.

Each end 11 of the sections 3 has a beveled edge 13 and one or more peripheral grooves 15, which is carved or otherwise formed in an outer surface 17 thereof. Each of the grooves 15 has a first wall 19, disposed closer to the near end 11 of the pipe 3, and a second wall 21. The first wall 19 is generally radially oriented and the second wall 21 is generally tapered away from the first wall 19, as shown in FIG. 4.

Each of the couplings 9 is generally cylindrically shaped and has a semi-rigid outer layer or outer sleeve 23 and an inner layer or inner sleeve 25. The outer layer 23 is generally constructed of polyvinylchloride, or other suitable material. The inner layer 25 is generally approximately the same length as the outer layer 23 and is fixedly secured thereto by chemical bonding or other suitable means. The inner layer 25 is generally constructed of a compressible, elastomeric thermoplastic resin material, such as high density polyethylene, polypropylene, polybutylene, or other suitable material, which is impervious to materials both within and without the pipes 3 which may come in contact with the inner layer 25 for a particular application. Preferably, the elastomeric materials have properties of 68–70 durometer.

The inner layer 25 of each of the couplings 9 has an inwardly extending lip 27 spaced approximately medially between a first end 29 and a second end 30 thereof. The inner layer 25 provides locking means, such as a pair of opposing sets of sawtooth ridges 31 and 32, one on each side of the lip 27. Each of the sawtooth ridges 31 and 32 has a mating side 33 facing the lip 27, which is generally radially oriented, and a back side 35, which is generally tapered outwardly toward the outer layer 23, with the mating side 33 and the back side 35 of each of the sawtooth ridges 31 and 32 joining at a tip 36, as shown in FIG. 4. As a result, the mating sides 33 of the first set of the sawtooth ridges 31 on one side of the lip 27 generally face toward the mating sides 33 of the second set of the sawtooth ridges 32 on the other side of the lip 27.

One of the grooves 15, such as that designated by the numeral 37 in FIG. 4, is spaced from the end 11 such that as one of the pipe sections 3 is inserted into one of the couplings 9 and the end 11 is biased against the lip 27 in an abutting arrangement, the respective tip 36 of one of the sawtooth ridges 31 or 32, such as that designated by the numeral 39 in FIG. 4, is received by the first groove 37 whereby its mating side 33 is biased in an abutting engagement with the first wall 19 of the groove 37. Similarly, for those applications where the pipe section 3 has another one of the grooves 15, such as that designated by the numeral 43, the respective tip 36 of another one of the sawtooth ridges 31 or 32 is in abutting engagement with the first wall 19 of the second groove 43.

In one application of the present invention, the spacings between the lip 27 and the first mating side 33 and between succeeding ones of the mating sides 33 are approximately 0.45" for pipe sections 3 having an outside diameter of 4.5". Similarly, the spacings between successive ones of the first walls 19 are approximately 0.45". The widths of the grooves 15 is approximately 0.15" and the depths of the grooves 15 are approximately 0.075". The couplings 9 have axial lengths of approximately 6".

In an application of the present invention, one of the couplings 9 is telescoped over one of the ends 11 of the pipe section 5. The inner layer 25 of the coupling 9 is dimensioned such that as the end 11 is inserted therein, the inner layer 25 is compressed between the outer layer 23 and the section 5. While inserting the end 11 into the coupling 9, the back sides 35 of the sawtooth ridges 31 provide a camming force to facilitate insertion of the end 11 into the coupling 9 by expanding the inner layer 25 as the end 11 is inserted. As the end 11 is sufficiently inserted into the coupling 9 by turning, twisting or rotating as appropriate such that the end 11 is biased against the lip 27, certain ones of the sawtooth ridges 31 or 32, which are spaced alongside their respective grooves 15, expand to assume their normal, uncompressed state, thereby seating the respective tips 3 in abutting engagement with the respective first walls 19.

Similarly, a second one of the pipes 3, such as that designated by the numeral 7, is inserted axially into the coupling 9 such that the end 11 of the pipe 7 is in abutting engagement with the lip 27, compressing the lip 27 between the pipes 5 and 7, such that a fluid-tight seal is formed between the lip 27 and the pipes 5 and 7. The sawtooth ridges 31 and 32 spaced beyond the grooves 15 remain compressed and provide a biasing arrangement between the coupling 9 and the respective pipes 5 and 7 such that the coupling 9 assists with maintaining axial alignment of the pipes 5 and 7. It is to be understood that the outer surfaces 17 of the ends 11 should be sufficiently smooth to allow insertion of the ends 11 without damaging the inner layers 25.

Summarizing, the sawtooth ridges 31 and 32 are adapted to snap into and engage the respective grooves 15 such that the ends of the pipes 5 and 7 are maintained in end opposing coaxial alignment, and the lip 27 is compressed therebetween, creating a fluid-tight seal between the contents of the pipes 5 and 7 and the environment surrounding the pipes 5 and 7. In addition, the abutting engagement between the sawtooth ridges 31 and 32 and the grooves 15 resists axial forces which might tend to cause axially outward movement of the pipe 5 relative to the coupling 9. As a result, the pipes 5 and 7 are joined together without the use of an environmentally contaminating cement.

2. Modified Embodiment of the Invention

A modified pipe jointing system in accordance with the present invention is shown in FIG. 5 and is generally designated by the reference numeral 60. Many of the characteristics of the modified pipe jointing system 60 are substantially similar to those described for the pipe jointing system 1 and are not reiterated here in detail.

The modified system 60 includes a plurality of the pipes 62, such as pipes 64 and 66 as shown in FIG. 5, and a coupling 68. The coupling 68 has an outer layer 70 fixedly secured to an inner layer 72. The inner layer 72 has a medially spaced, inwardly directed lip 74 and opposing sets 76 and 78 of inwardly directed, sawtooth ridges 80.

The outer layer 70 and the inner layer 72 of each of the couplings 68 are dimensioned such that as one of the pipes 62 is inserted in One of the couplings 68, the inner layer 72 is compressed between the pipe 62 and the outer layer 70 such that sufficient frictional force is created between the inner layer 72 and the pipe 62 to normally resist axial movement of the pipe 62 relative to the coupling 68. The pipe 62 is inserted into the coupling 68 such that the pipe 62 is spaced in abutting engagement with the lip 74. Another one of the pipes 62 is similarly inserted into the coupling 68 to correspondingly form abutting engagement with the lip 74. The lip 74 is compressed between the opposing pipes 62 such that a fluid-tight seal is formed between the lip 74 and the pipes 62.

It is to be understood that the present invention is equally applicable to large pipes, such as for various plumbing and drainage applications, and small pipes, such as for various medical applications and the like. Further, the present invention is applicable to rigid and semi-rigid pipes as well as flexible pipes and tubes. In the latter case, however, adapters may be required for the transition from such flexible pipes to a connecting coupling.

It is also to be understood that while certain forms of the present invention have been illustrated and described herein, it is not to be limited to the specific forms or arrangement of parts described and shown.

What is claimed and desired to be secured by Letters Patent is as follows:

1. A system for joining first and second pipes each having an open end and an outer surface, which comprises:
   (a) a coupling shell having a generally cylindrical configuration with first and second open shell ends positioned opposite each other and a shell bore extending longitudinally between and open at said ends, said shell comprising a semi-rigid material;
   (b) a coupling sleeve including:
      (1) a generally cylindrical configuration;
      (2) opposite first and second open sleeve ends;
      (3) a sleeve bore extending between and open at said sleeve ends;
      (4) said sleeve comprising an elastomeric material;
      (5) said sleeve being fastened to said shell within said shell bore with said sleeve ends substantially flush with said shell ends;
      (6) an annular sleeve rib extending radially inwardly from said sleeve bore and positioned generally medially between said sleeve ends, said sleeve rib forming a generally circular sleeve rib opening;
      (7) first and second sets of sleeve ridges each positioned between a respective sleeve end and said sleeve rib;
      (8) each said ridge set comprising a plurality of adjacent, juxtaposed, annular, non-pitched, continuous ridges;
      (9) each said ridge having a first annular edge extending generally radially inwardly into said bore and a second annular edge with a medially-converging orientation, said ridge edges intersecting at a generally circular line of intersection forming an inside diameter of said coupling sleeve;
      (10) respective first and second edges of adjacent ridges intersecting at generally circular line intersections with greater diameters than said sleeve inside diameter; and
      (11) first and second annular flats each located between a respective ridge set and said rib;
   (c) each said pipe including:
      (1) a chamfered edge at the end thereof; and
      (2) first and second pipe end grooves each having a groove first wall extending generally radially inwardly from said pipe outer surface; a groove second wall converging radially inwardly from said pipe outer surface in a direction toward said pipe end; an annular pipe groove flat located between said pipe groove walls in generally parallel relation with respect to said pipe outer surface; and a generally circular line of intersection between said pipe groove second wall and said pipe outer surface;
   (d) first and second pipe end annular sealing intersections formed between each pipe end and said sleeve rib;
   (e) a plurality of annular pipe groove first wall intersections each formed between a respective pipe groove first wall and a respective ridge first edge; and
   (f) a plurality of annular ridge second edge sealing intersections each formed at an intersection of a respective sleeve ridge second edge and a respective pipe groove circular intersection line.

2. A method of joining first and second pipes each having an open end and an outer surface, which comprises the steps of:
   (a) providing a coupling shell having a generally cylindrical configuration with first and second open shell ends positioned opposite each other and a shell bore extending longitudinally between and open at said ends, said shell comprising a semi-rigid material;
   (b) providing a coupling sleeve including:
      (1) a generally cylindrical configuration;
      (2) opposite first and second open sleeve ends;
      (3) a sleeve bore extending between and open at said sleeve ends;
      (4) said sleeve comprising an elastomeric material;
      (5) said sleeve being fastened to said shell within said shell bore with said sleeve ends substantially flush with said shell ends;
      (6) an annular sleeve rib extending radially inwardly from said sleeve bore and positioned generally medially between said sleeve ends, said sleeve rib forming a generally circular sleeve rib opening;

(7) first and second sets of sleeve ridges each positioned between a respective sleeve end and said sleeve rib;

(8) each said ridge set comprising a plurality of adjacent, juxtaposed, annular, non-pitched, continuous ridges;

(9) each said ridge having a first annular edge extending generally radially inwardly into said bore and a second annular edge with a medially-converging orientation, said ridge edges intersecting at a generally circular line of intersection forming an inside diameter of said coupling sleeve;

(10) respective first and second edges of adjacent ridges intersecting at generally circular line intersections with greater diameters than said sleeve inside diameter; and

(11) first and second annular flats each located between a respective ridge set and said rib;

(c) providing each said pipe with:

(1) a chamfered edge at the end thereof; and (2) first and second pipe end grooves each having a groove first wall extending generally radially inwardly from said pipe outer surface; a groove second wall converging radially inwardly from said pipe outer surface in a direction toward said pipe end; an annular pipe groove flat located between said pipe groove walls in generally parallel relation with respect to said pipe outer surface; and a generally circular line of intersection between said pipe groove second wall and said pipe outer surface;

(d) inserting said first and second pipe ends through said first and second sleeve ends and into said sleeve bore;

(e) engaging said first and second pipe ends with said sleeve rib to form respective first and second pipe end annular sealing intersections therebetween;

(f) engaging a plurality of pipe groove first walls with respective ridge first edges to form a plurality of respective annular pipe groove first wall intersections; and (g) engaging a plurality of sleeve ridge second edges with respective pipe groove circular intersection lines to form a plurality of respective annular ridge second edge sealing intersections.

* * * * *